(12) United States Patent
Suresha et al.

(10) Patent No.: US 12,524,583 B2
(45) Date of Patent: Jan. 13, 2026

(54) PROPERTY MODELING USING ATTENTIVE NEURAL PROCESSES

(71) Applicant: Schlumberger Technology Corporation, Sugar Land, TX (US)

(72) Inventors: Suhas Suresha, Menlo Park, CA (US); Anatoly Aseev, Menlo Park, CA (US); Alfredo De La Fuente, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/706,243

(22) PCT Filed: Nov. 30, 2022

(86) PCT No.: PCT/US2022/051393
§ 371 (c)(1),
(2) Date: Apr. 30, 2024

(87) PCT Pub. No.: WO2023/102041
PCT Pub. Date: Jun. 8, 2023

(65) Prior Publication Data
US 2024/0330524 A1   Oct. 3, 2024

Related U.S. Application Data

(60) Provisional application No. 63/284,606, filed on Nov. 30, 2021.

(51) Int. Cl.
*G06F 30/13*   (2020.01)
*G06N 5/022*   (2023.01)

(52) U.S. Cl.
CPC .............. *G06F 30/13* (2020.01); *G06N 5/022* (2013.01)

(58) Field of Classification Search
CPC ...... G06F 30/13; G06N 5/022; G06N 3/0464; G06N 3/0455; G06N 3/088; G01V 20/00; G01V 1/303; G01V 1/306
See application file for complete search history.

(56) References Cited

U.S. PATENT DOCUMENTS 11,115,645 B2 * 9/2021 Yang .................. G06V 10/7715
11,520,077 B2 * 12/2022 Denli .................... G06N 20/20
(Continued)

OTHER PUBLICATIONS

Neural Attention Models in Deep Learning: Survey and Taxonomy Correia et al. (Year: 2021).*
(Continued)

*Primary Examiner* — Viker A Lamardo
*Assistant Examiner* — Ababacar Seck
(74) *Attorney, Agent, or Firm* — Jeffrey D. Frantz

(57) ABSTRACT

A method implements property modeling using attentive neural processes. The method includes receiving sparse context input comprising a plurality of context locations corresponding to a plurality of geological property values for a geological property and selecting a plurality of target locations in a space of the plurality of context locations. The method further includes generating a predicted mean image for the geological property by an attentive neural process model using the plurality of target locations and the sparse context input and presenting the predicted mean image.

16 Claims, 15 Drawing Sheets

(56) References Cited

U.S. PATENT DOCUMENTS

| | | | | |
|---|---|---|---|---|
| 2010/0254463 | A1* | 10/2010 | Narroschke | H04N 19/172 375/E7.193 |
| 2011/0205844 | A1* | 8/2011 | Maucec | G01V 1/00 367/43 |
| 2011/0272161 | A1* | 11/2011 | Kumaran | G01V 1/301 702/179 |
| 2012/0095741 | A1* | 4/2012 | Jin | G06F 30/20 703/9 |
| 2013/0013202 | A1* | 1/2013 | Som | G09B 29/106 701/532 |
| 2013/0215961 | A1* | 8/2013 | Nakagawa | H04N 19/14 375/240.03 |
| 2014/0278115 | A1* | 9/2014 | Bas | G01V 20/00 702/14 |
| 2016/0145991 | A1* | 5/2016 | Yarus | E21B 47/022 700/275 |
| 2016/0146973 | A1* | 5/2016 | Johnson | G01V 1/306 702/2 |
| 2016/0203386 | A1* | 7/2016 | Porecki | G06T 11/60 382/159 |
| 2017/0228925 | A1* | 8/2017 | Drinovsky | G06T 17/05 |
| 2017/0301116 | A1 | 10/2017 | Zhu | |
| 2018/0336309 | A1* | 11/2018 | Shi | G06T 11/203 |
| 2019/0073580 | A1* | 3/2019 | Dzhulgakov | G06N 3/045 |
| 2019/0361147 | A1* | 11/2019 | Frambati | G01V 20/00 |
| 2020/0020098 | A1* | 1/2020 | Odry | G06T 7/0012 |
| 2020/0183047 | A1 | 6/2020 | Denli | |
| 2020/0257979 | A1* | 8/2020 | Luo | G06N 3/048 |
| 2020/0301036 | A1* | 9/2020 | Ramfjord | E21B 7/04 |
| 2020/0372327 | A1* | 11/2020 | Qiu | G06N 3/047 |
| 2021/0090239 | A1 | 3/2021 | Pattnaik | |
| 2021/0256358 | A1 | 8/2021 | Deng et al. | |
| 2021/0286270 | A1* | 9/2021 | Middlebrooks | G06N 3/047 |
| 2021/0350555 | A1* | 11/2021 | Fischetti | G06T 7/73 |
| 2022/0147818 | A1* | 5/2022 | Zhang | G06N 3/047 |
| 2022/0366246 | A1* | 11/2022 | Danihelka | G06N 3/08 |
| 2023/0032044 | A1* | 2/2023 | Li | G01V 1/282 |
| 2023/0086355 | A1* | 3/2023 | Wichern | G06N 3/08 704/200 |

OTHER PUBLICATIONS

A Simple Neural Attentive Meta-Learner Mishra et al. (Year: 2018).*
Subject Category Classification of Scholarly Papers Using Deep Attentive Neural Networks Bharath Kandimalla (Year: 2020).*
An Evaluation of Image Noise Variance for Time-of-Flight PET Charles C. Watson, Senior Member, IEEE (Year: 2007).*
Evaluation of Image Signal-to-Noise Ratio in Time-of-flight PET Clementel et al. (Year: 2010).*
Recurrent Attentive Neural Process for Sequential Data Qin et al. (Year: 2019).*
Conditional Neural Processes Garnelo et al. (Year: 2018).*
Attentive Neural Processes Kim et al. (Year: 2019).*
Implicit Structural Modeling of Geological Structures with Deep Learning Bi et al. (Year: 2021).*
Search Report and Written Opinion of International Patent Application No. PCT/US2022/051393 dated Apr. 4, 2023, 7 pages.
Garnelo, M. et al., "Neural Processes", arXiv:1807.01622v1, Presented at the ICML 2018 workshop on Theoretical Foundations and Applications of Deep Generative Models, 11 pages.
Kim, H. et al., "Attentive Neural Processes", arXiv:1901.05761v2, Published as a conference paper: Presented at the 2019 International Conference on Learning Representations, 18 pages.
Abubakar, Aria et al., SPE-205985-MS, Automating Well Log Correlation Workflow Using Soft Attention Convolutional Neural Networks, Sep. 21, 2021, pp. 1-11.

* cited by examiner

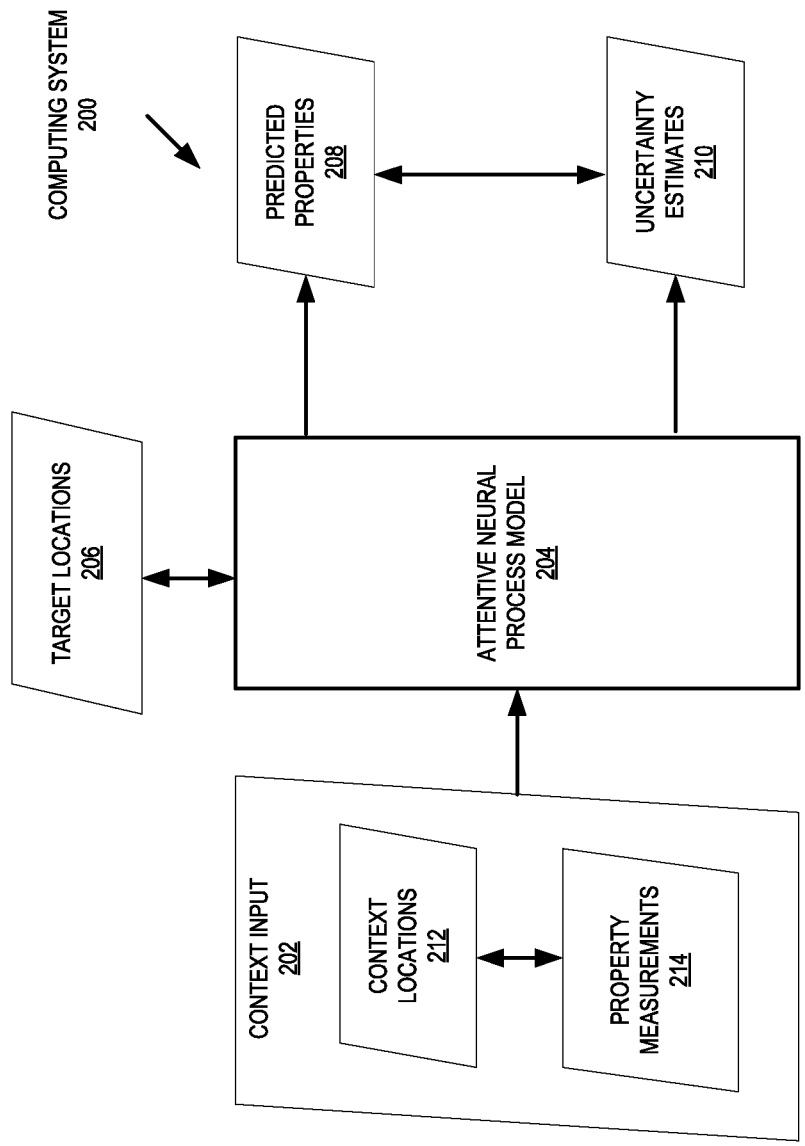
FIG. 2.1

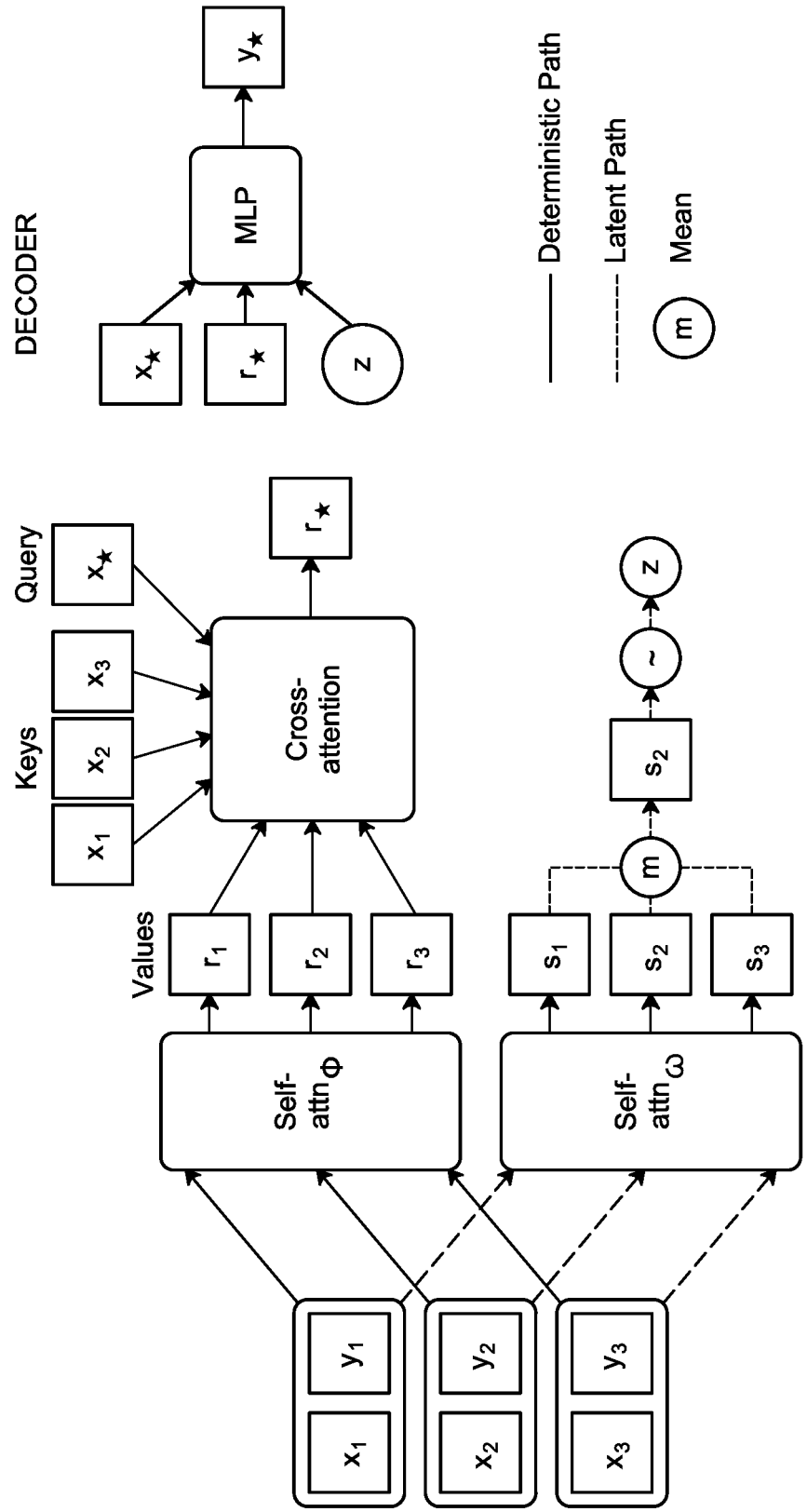
FIG. 2.2

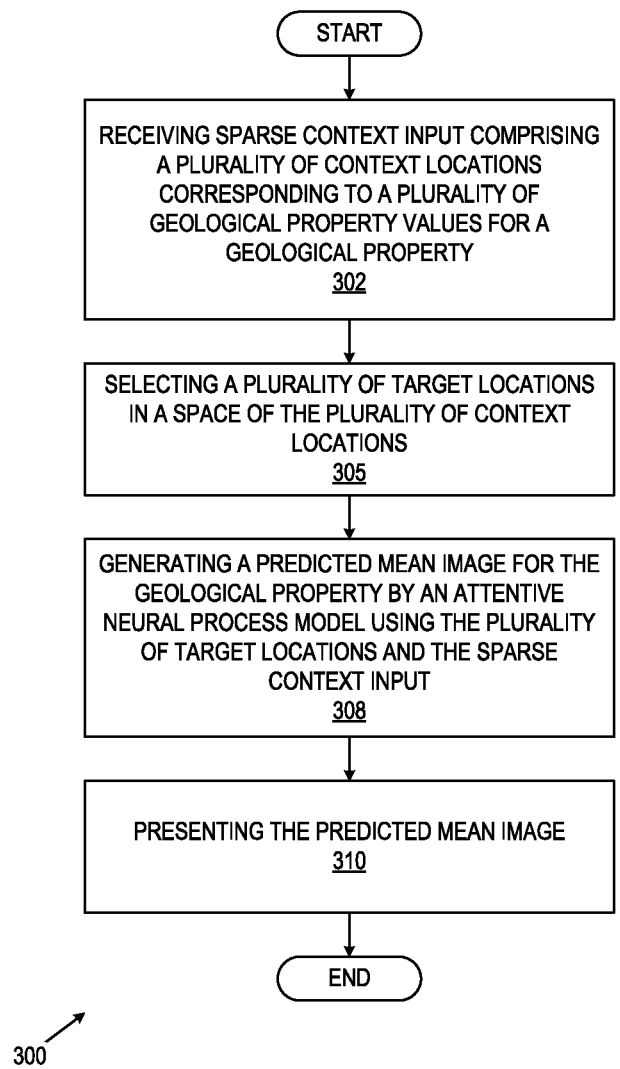
FIG. 3.1

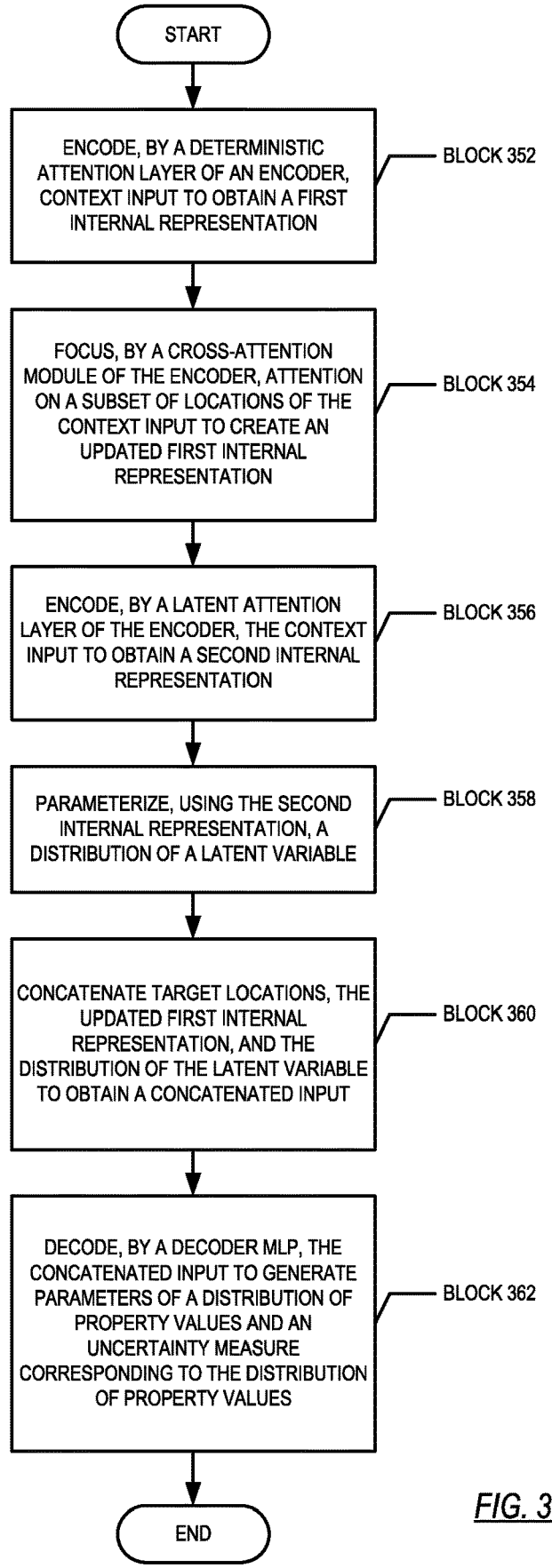
FIG. 3.2

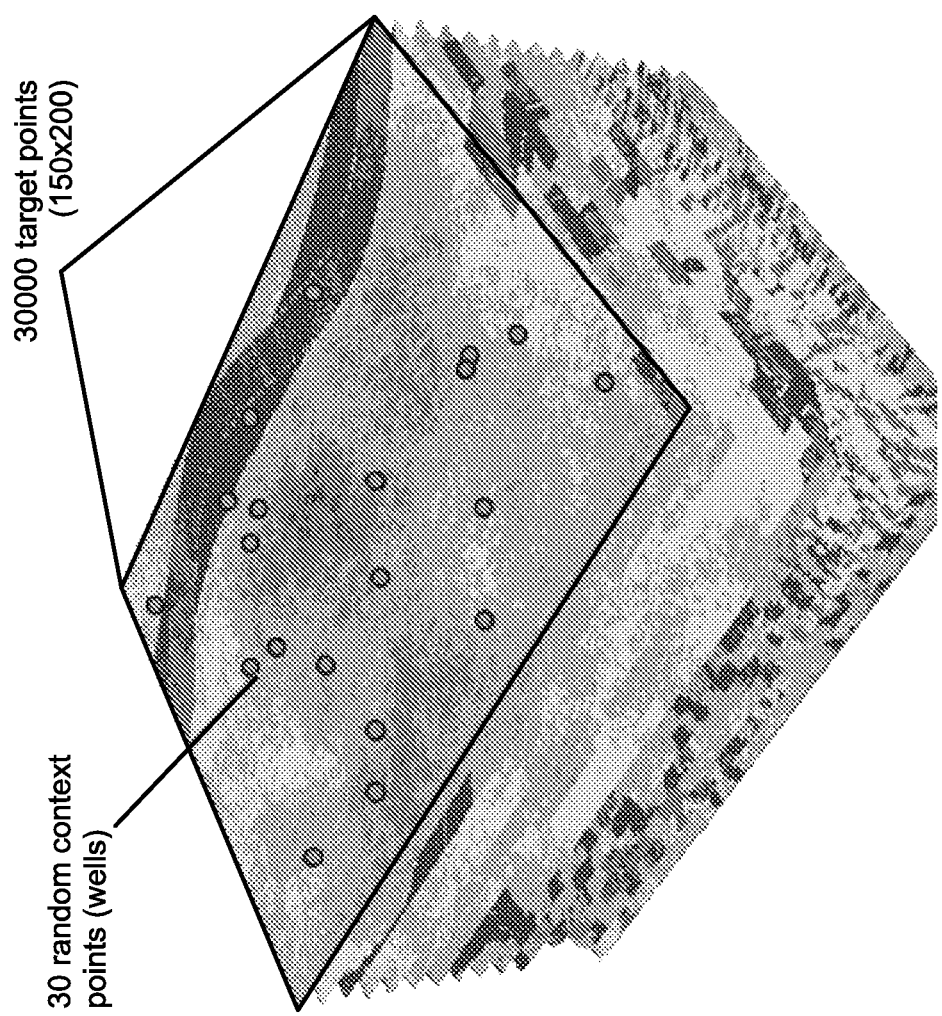
FIG. 4.1

$$\log p(y_T | x_T, x_C, y_C) \geq \mathbb{E}_{q(z|s_T)} \log p(y_T | x_T, r_C, z_C)] - KL(q(z|s_T) \| q(z|s_C))$$
FIG. 4.2
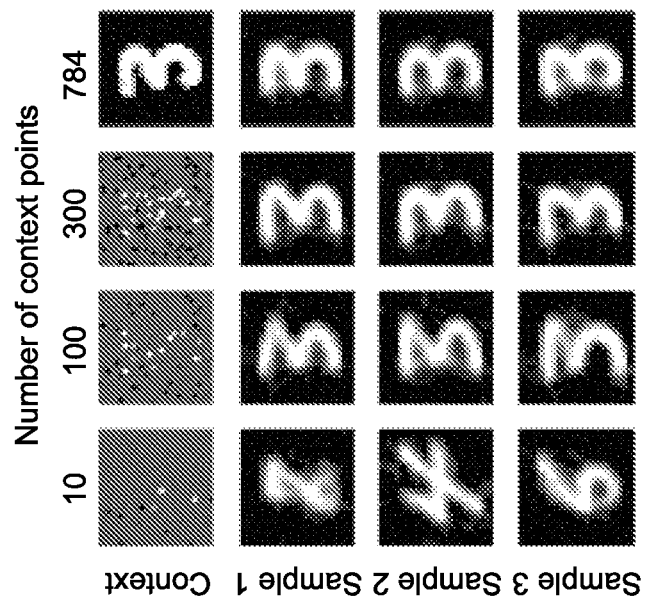
FIG. 4.3
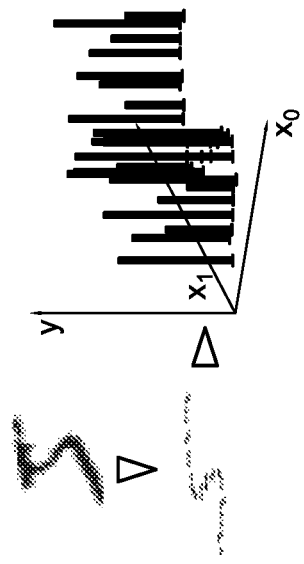

| | i | j | k | Rand | Al | Density | Fancies | Perm |
|---|---|---|---|---|---|---|---|---|
| 0 | 1 | 1 | 200 | -0.567085 | 8.821233 | 2.464576 | 0 | 0.018552 |
| 1 | 2 | 1 | 200 | 0.519785 | 8.664900 | 2.441608 | 0 | 0.026003 |
| 2 | 3 | 1 | 200 | 0.053321 | 8.954897 | 2.462323 | 0 | 0.12850 |
| 3 | 4 | 1 | 200 | 0.155625 | 8.847089 | 2.452234 | 0 | 0.018847 |
| 4 | 5 | 1 | 200 | -1.299688 | 8.908966 | 2.455819 | 0 | 0.015967 |
| 5 | 6 | 1 | 200 | 0.621952 | 8.846308 | 2.457444 | 0 | 0.019199 |
| 6 | 7 | 1 | 200 | 0.071776 | 8.812842 | 2.459117 | 0 | 0.026543 |
| 7 | 8 | 1 | 200 | -0.353503 | 8.672939 | 2.447989 | 0 | 0.054786 |
| 8 | 9 | 1 | 200 | 1.390551 | 8.692593 | 2.438583 | 0 | 0.037052 |
| 9 | 10 | 1 | 200 | -1.236772 | 9.028710 | 2.463888 | 0 | 0.043182 |
| 10 | 11 | 1 | 200 | 0.874448 | 8.780755 | 2.460670 | 0 | 0.037162 |

*FIG. 4.4*

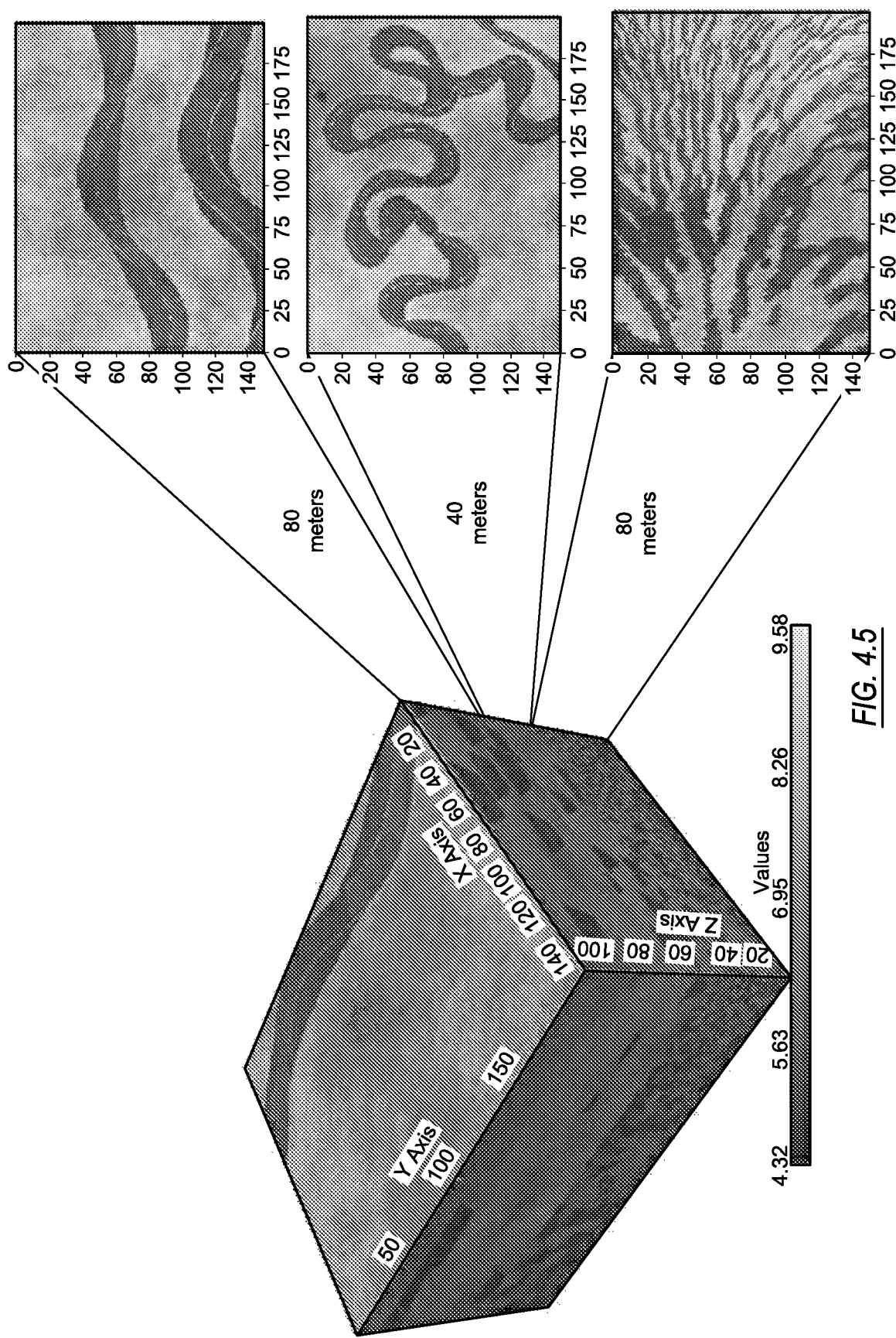
FIG. 4.5

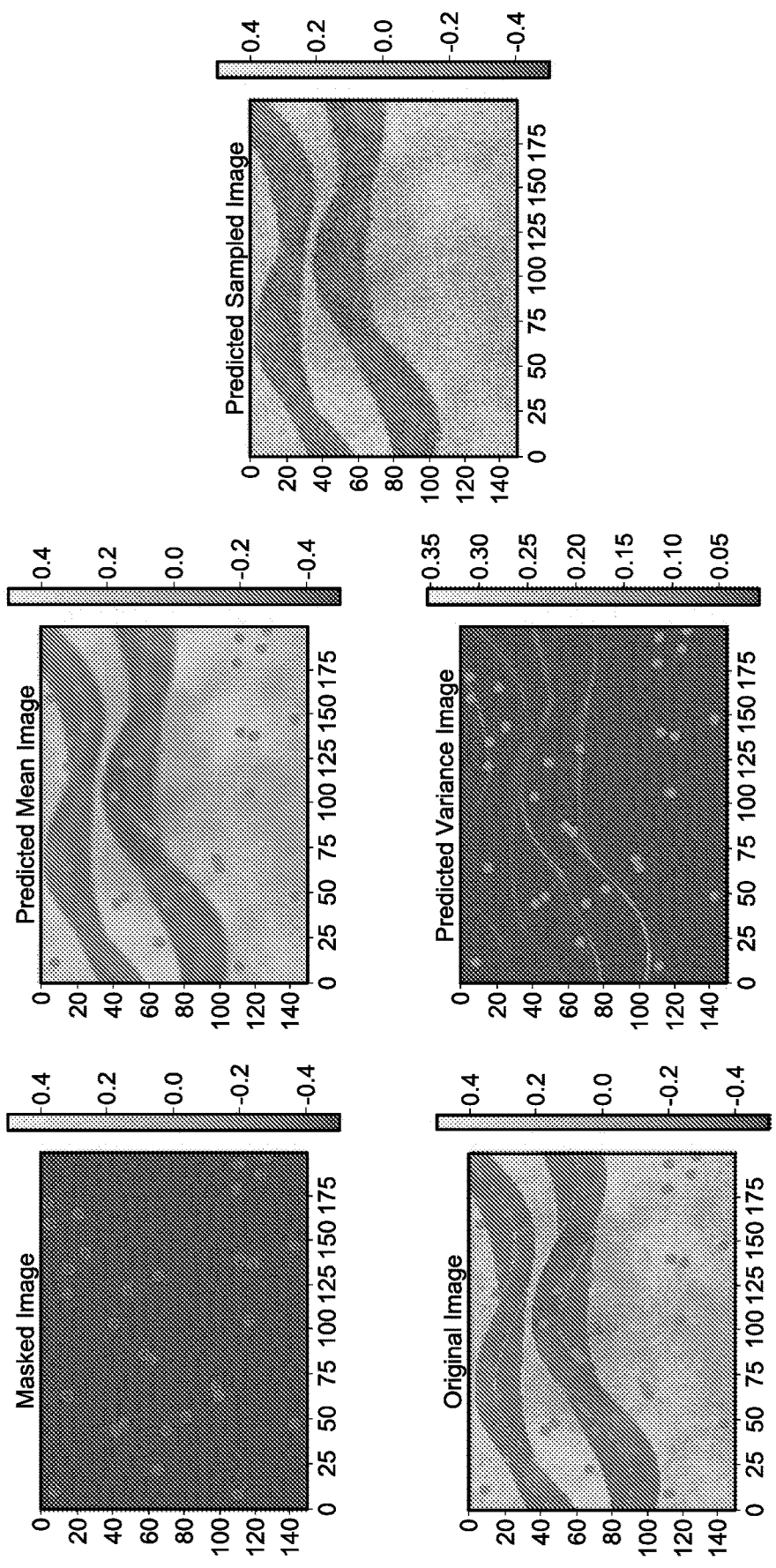
FIG. 4.6

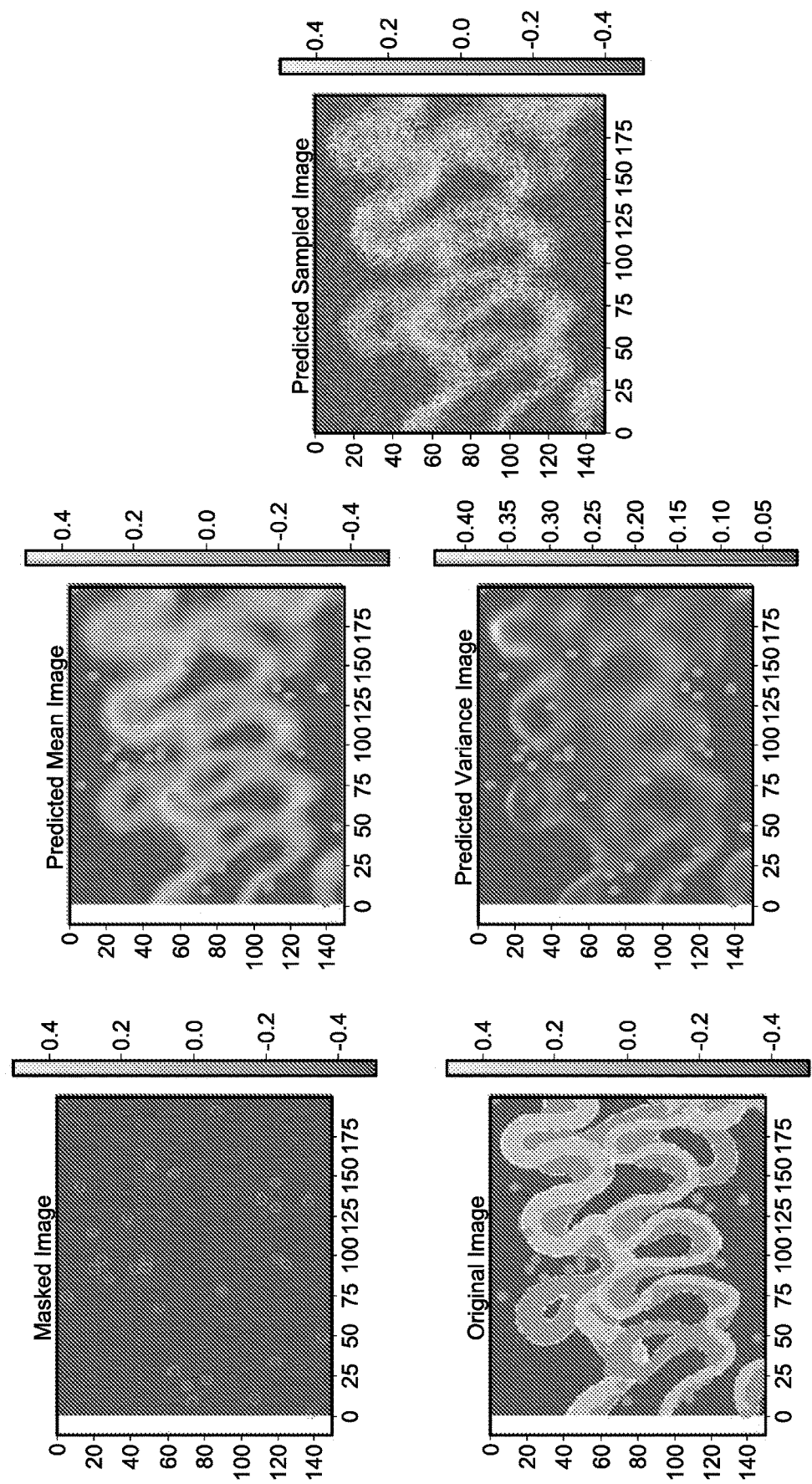
FIG. 4.7

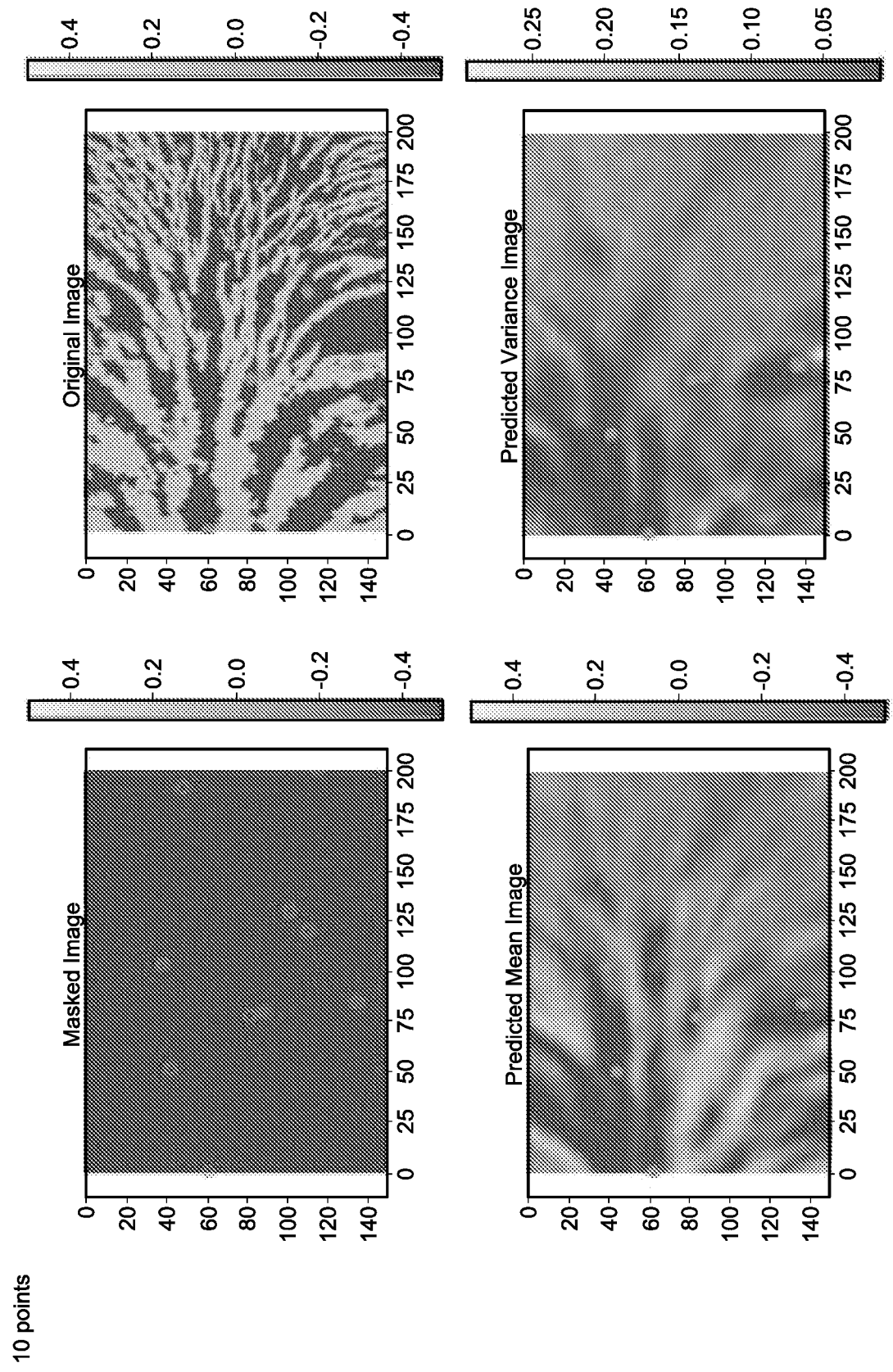
FIG. 4.8

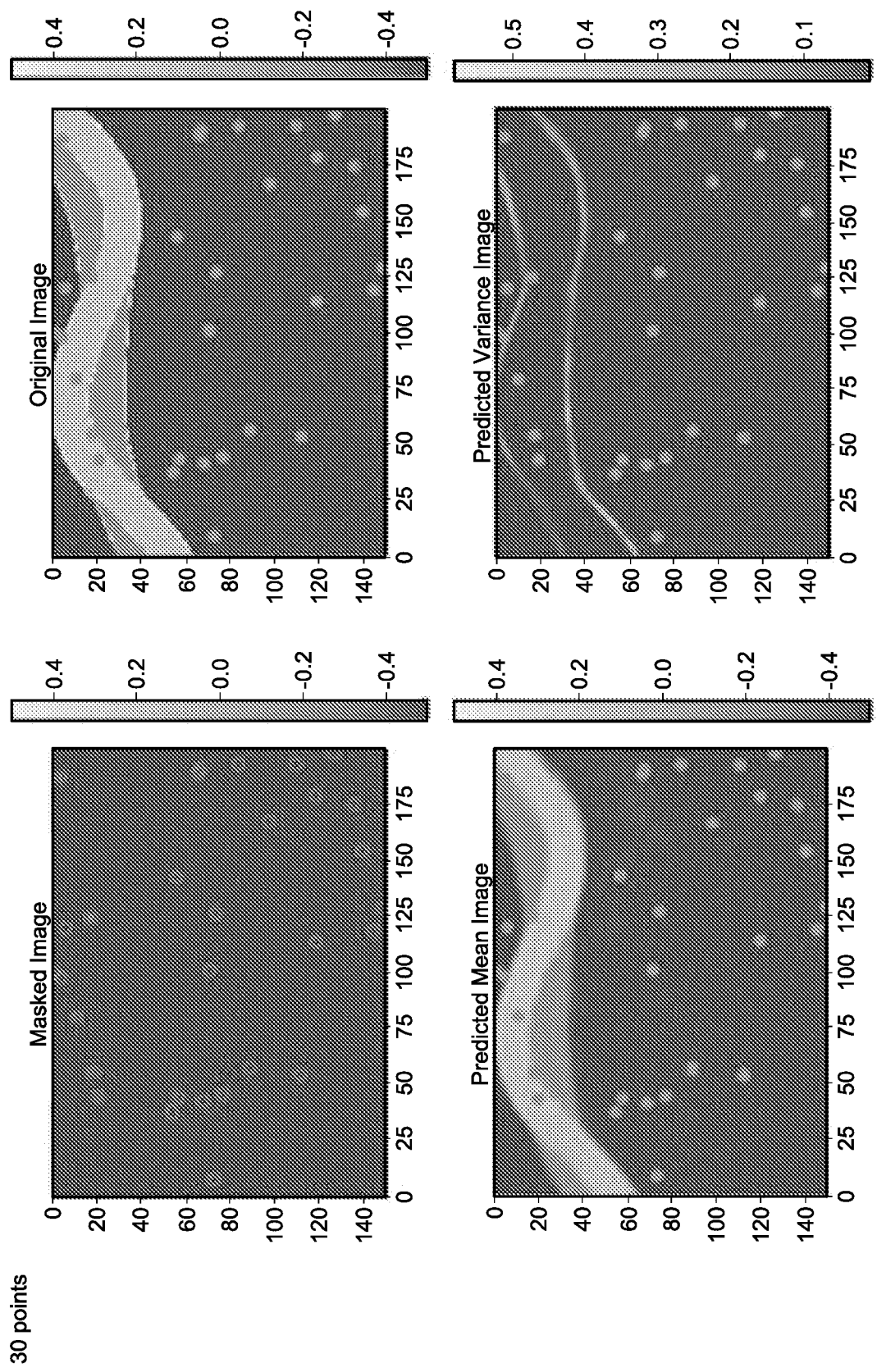
FIG. 4.9

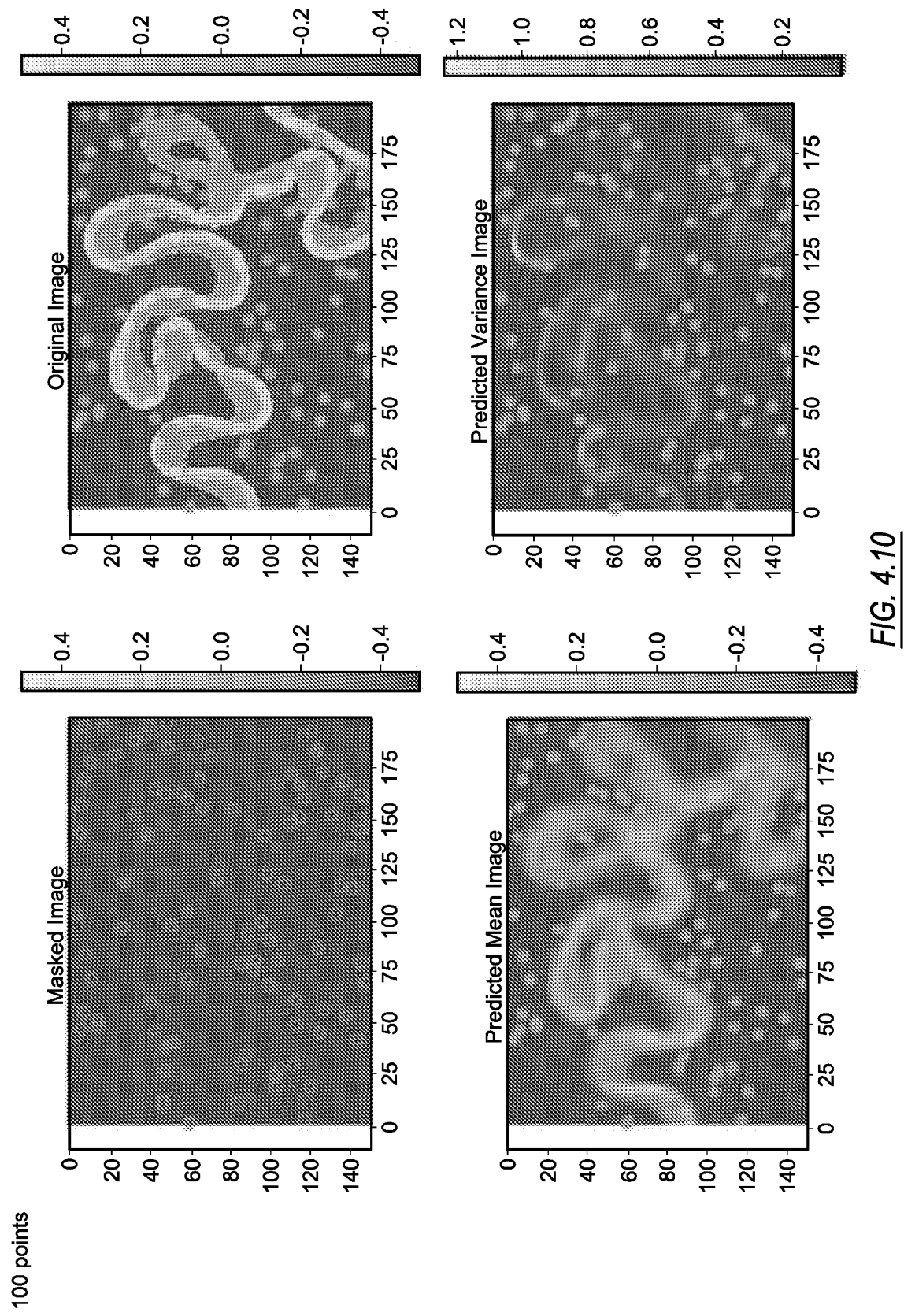
FIG. 4.10

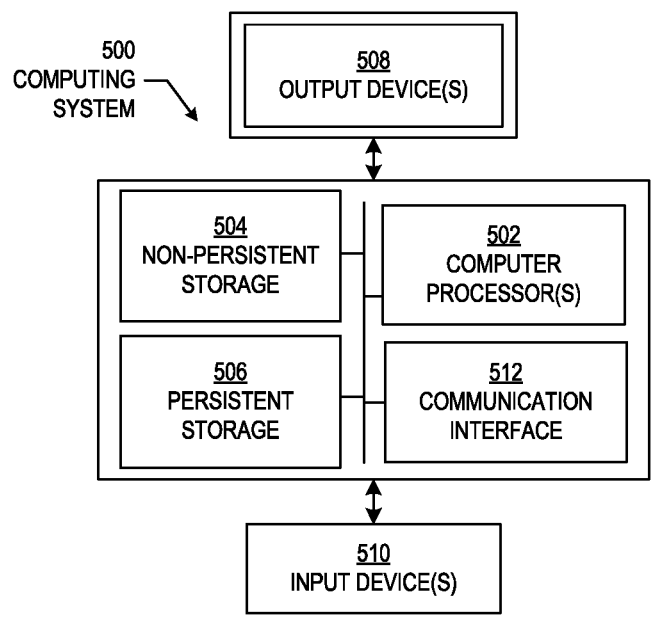
*FIG. 5.1*
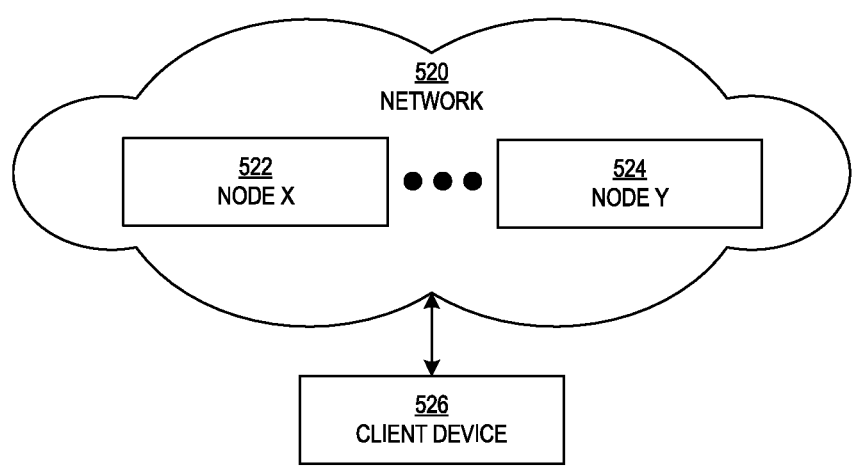
*FIG. 5.2*

PROPERTY MODELING USING ATTENTIVE NEURAL PROCESSES

CROSS-REFERENCE TO RELATED APPLICATIONS

This application claims the benefit of U.S. provisional application 63/284,606, filed Nov. 30, 2021, which is incorporated by reference herein.

BACKGROUND

Generating a reliable subsurface model from sparse physical measurements is a valuable step for natural resource management and geological process quantification. The modeling process involves inferring geological properties, such as rock type, over a wide area given measurements at several locations. Building a reliable property model from sparse well measurements is challenging due to several requirements: 1) the model maintains the data distribution from the sparse well measurements, 2) the model maintains data heterogeneity and spatial heterogeneity, and 3) the model maintains geological consistency.

As there are many plausible predictions while modeling the geological properties, understanding the uncertainty is useful. Estimation of uncertainty helps in managing risks of exploration failure due to incorrect property modeling. Currently, an average offshore rig costs $200 million and the optimistic success rate for exploration is approximately 50%. Hence, it is useful to have subsurface models, as well as provide a measure of uncertainty for predictions.

Deep learning techniques like generative adversarial networks (GANs) may be used for property modeling. GANs may produce realistic patterns conditioned on sparse physical measurements without using prior knowledge. While GANs may learn to capture distribution of patterns, GANs do not provide a quantitative estimate of uncertainty like Kriging. A challenge is to use machine learning techniques that generate realistic patterns with uncertain information.

SUMMARY

In general, in one or more aspects, the disclosure relates to a method implementing property modeling using attentive neural processes. The method includes receiving sparse context input comprising a plurality of context locations corresponding to a plurality of geological property values for a geological property and selecting a plurality of target locations in a space of the plurality of context locations. The method further includes generating a predicted mean image for the geological property by an attentive neural process model using the plurality of target locations and the sparse context input and presenting the predicted mean image.

Other aspects of the invention will be apparent from the following description and the appended claims.

BRIEF DESCRIPTION OF DRAWINGS

FIG. 2.1 and FIG. 2.2 show diagrams of systems in accordance with one or more embodiments.

FIG. 3.1 and FIG. 3.2 show flowcharts in accordance with one or more embodiments.

FIG. 4.1, FIG. 4.2, FIG. 4.3, FIG. 4.4, FIG. 4.5, FIG. 4.6, FIG. 4.7, FIG. 4.8, FIG. 4.9, and FIG. 4.10 show examples in accordance with one or more embodiments.

FIG. 5.1 and FIG. 5.2 show diagrams of computing systems in accordance with one or more embodiments.

DETAILED DESCRIPTION

Figure 1:
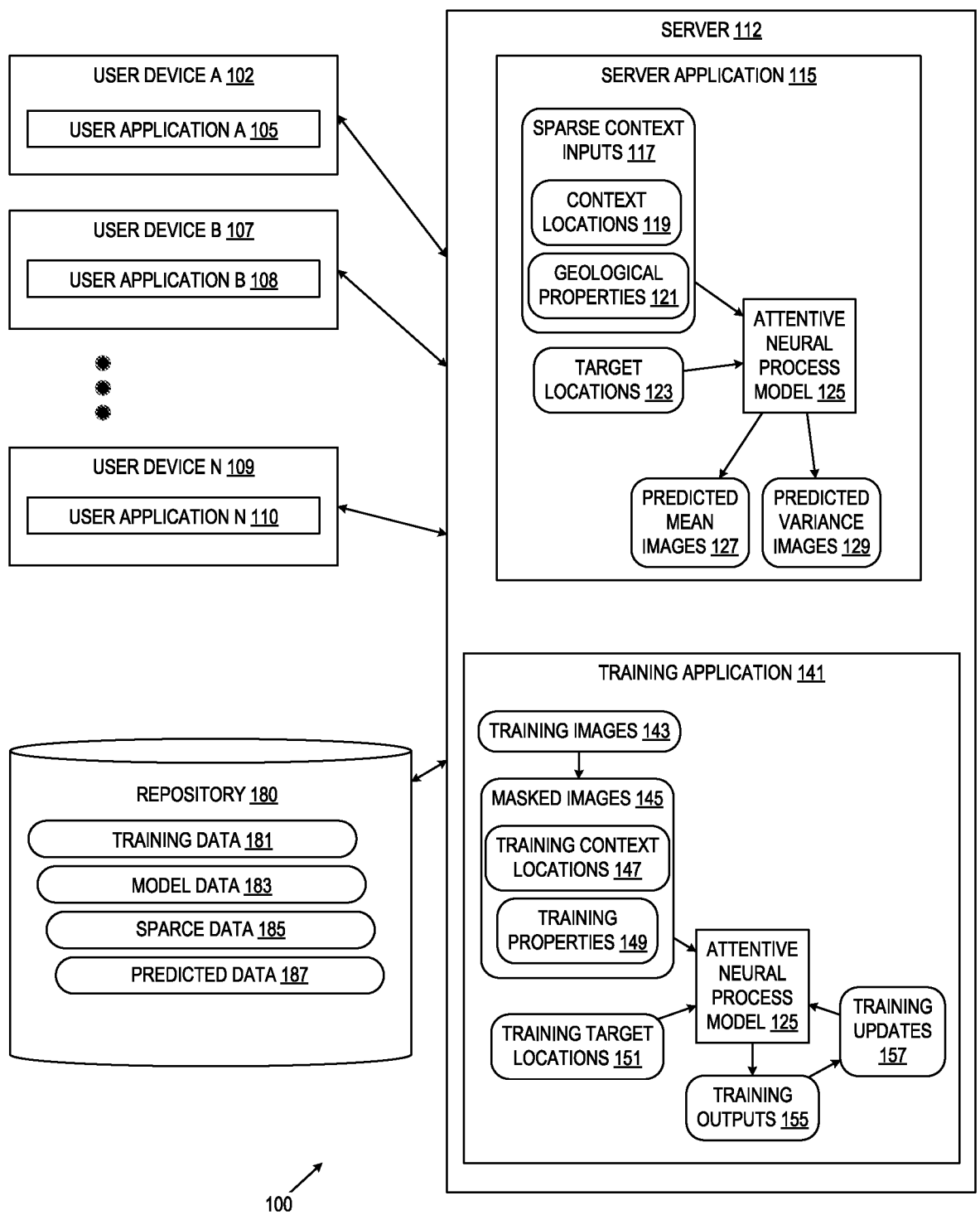
FIG. 1 shows a diagram of a system in accordance with one or more embodiments.

Specific embodiments of the disclosure will now be described in detail with reference to the accompanying figures. Like elements in the various figures are denoted by like reference numerals for consistency.

The present disclosure relates to modeling geological properties with an attentive neural process (ANP) model. A Neural Process (NP) model combines the benefits of stochastic processes and neural networks to learn distributions over functions and generate flexible predictions conditioned on context input. Context input includes physical measurements of properties (e.g., acoustic impedance, density, porosity, etc.) sampled at locations (e.g., a depth of a well). The disclosed methodology provides accurate estimates of properties and also provides estimates of uncertainty for the predictions. The present disclosure incorporates an attention layer into the NP model to focus attention on the context input locations corresponding to the relevant true measurements, thereby improving model accuracy. The resulting model is an ANP model. Given sparse physical measurements, the trained ANP model predicts a mean and variance for geological properties at arbitrary locations, enabling the generation of many realistic geological patterns. The variance provides a quantitative estimate of the uncertainty in the predictions. Thus, instead of depending on domain knowledge, the ANP model learns from available data.

Turning to FIG. 1, the system (100) implements property modeling using attentive neural processes. The system (100) processes the sparse context inputs (117) with the server (112) based on input from the user devices A (102) and B (107) through N (109). The system (100) includes the server (112), the user devices A (102) and B (107) through N (109), and the repository (180).

The server (112) is a computing system (further described in FIG. 5.1). The server (112) may include multiple physical and virtual computing systems that form part of a cloud computing environment. In one embodiment, execution of the instructions, programs, and applications of the server (112) is distributed to multiple physical and virtual computing systems in the cloud computing environment. The server (112) includes the server application (115).

The server application (115) is a collection of programs with instructions that may execute on multiple servers of a cloud environment, including the server (112). The server application (115) processes the sparse context inputs (117) with the target locations (123) to generate the predicted mean images (127) and the predicted variance images (129). In one embodiment, the server application (115) hosts websites and may serve structured documents (hypertext markup language (HTML) pages, extensible markup language (XML) pages, JavaScript object notation (JSON) files, and messages, etc.) to interact with the user devices A (102) and B (107) through N (109) to identify the sparse context inputs (117) and present one or more of the predicted mean images (127) and the predicted variance images (129). The server application (115) includes the attentive neural process model (125).

The sparse context inputs (117) are inputs to the attentive neural process model (125). In one embodiment, the sparse context inputs (117) may include geological data from well sites. In one embodiment, one of the sparse context inputs may be a two-dimensional or three-dimensional image in which the pixels represent values for the geological properties at physical locations. The pixels may correspond to longitude, latitude, and depth information that identifies the physical location where the geological property was measured. For a given pixel, geological data for one or multiple geological properties may be stored. The sparse context inputs (117) includes the context locations (119) and the geological properties (121).

In one embodiment, the sparse context inputs (117) are inputs that provide a sparse amount of context. The context includes the values for the geological properties, also referred to geological data. The sparse context inputs (117) are sparse because, for a given sparse context input, the sparse context input does not include geological data for each pixel in the sparse context input. For example, if the sparse context input is a two-dimensional image with a resolution of 150 by 200 for a total of 30,000 pixels, the sparse context input may have 10 and more total pixels with geological data. The number of pixels with information may correspond to the number of wells from which data may be measured.

The context locations (119) are locations within the sparse context inputs (117). The context locations (119) correspond to measurements of geological data. Each sparse context image of the sparse context inputs (117) may have a set of context locations that are unique.

The geological properties (121) are geological data stored in the sparse context inputs (117). The geological data may include geological and petrophysical properties like geological facies, porosity, permeability, P and S wave velocity, seismic attributes like acoustic impedance (AI), etc.

The target locations (123) are locations within the sparse context inputs (117). The target locations (123) identify the pixels of a sparse input for which the attentive neural process model (125) will be used to generate predictions. In one embodiment, the target locations (123) include the pixels of one of the sparse context inputs (117) that correspond to one of the predicted mean images (127) and to one of the predicted variance images (129).

The attentive neural process model (125) is a collection of programs with instructions that may execute on multiple servers of a cloud environment, including the server (112). In one embodiment, the instructions for the attentive neural process model (125) may include a location controller and a prediction controller. The attentive neural process model (125) is a machine learning model. The attentive neural process model (125) generates the predicted mean images (127) and the predicted variance images (129) using the sparse context inputs (117) and the target locations (123). In one embodiment, the attentive neural process model (125) is an attentive neural process model as described in FIG. 2.2.

In one embodiment, the instructions for the attentive neural process model (125) may include a location controller and a prediction controller. The location controller may select the target locations (123) used by the attentive neural process model (125) to generate the predicted mean images (127) and the predicted variance images (129). The prediction controller may generate the predicted mean images (127) and the predicted variance images (129) from the outputs of the attentive neural process model (125).

The predicted mean images (127) are the outputs from the attentive neural process model (125). In one embodiment, each pixel of one of the predicted mean images (127) is a predicted mean (average) value for one or more geological properties from the sparse context inputs (117).

The predicted variance images (129) are the outputs from the attentive neural process model (125). In one embodiment, each pixel of one of the predicted variance images (129) is a predicted variance (or standard deviation) value for one or more geological properties from the sparse context inputs (117).

The training application (141) is a collection of programs with instructions that may execute on multiple servers of a cloud environment, including the server (112). In one embodiment, the training application (141) may execute on a server that is different from the server that executes the server application (115). The training application (141) trains the attentive neural process model (125) using the training images (143), the masked images (145), the training target locations (151), the training outputs (155), and the training updates (157).

The training images (143) are images used to train the attentive neural process model (125). The training images (143) may be two-dimensional or three-dimensional images based on the type of inputs to the attentive neural process model (125).

The masked images (145) are masked versions of the training images (143). The masked images (145) are masked using the training context locations (147) to generate sparse context inputs for the attentive neural process model (125). The masked images (145) include the training context locations (147) and the training properties (149).

In one embodiment, the masked images (145) are used to run validation of the attentive neural process model (125). For example, the masked images (145) are generated, the attentive neural process model (125) is run on the masked images (145) using the context points, and then a comparison between model performance (inference, i.e., the output of the attentive neural process model (125)) with the real (unmasked or original) image is performed.

The training context locations (147) are locations within the masked images (145) for which data is included. The remaining locations that do not correspond to one of the training context locations (147) may be masked out (e.g., set to zero).

The training properties (149) correspond to geological data (or simulated geological data). The training properties (149) may include values for each of the pixels in the training images (143). The training images (143) are masked with the training context locations (147) to generate the masked images (145). For example, one training image may have 30,000 pixels, and each pixel may have values for geological properties. The training image is masked to form a masked image in which a sparse number of pixels (e.g., 30) of the masked include the values for geological properties, and the remaining pixels are set to zero.

The training target locations (151) are locations (i.e., pixels) in the masked images (145) for which the attentive neural process model (125) generates an output (e.g., one or more of a mean and variance). The outputs for a set of multiple target locations may correspond to the pixels of training images for mean and variance that form the training outputs (155).

The training outputs (155) is the output from the attentive neural process model (125). The training outputs (155) may include predicted mean images and predicted variance images generated from the masked images (145).

The training updates (157) are updates to the attentive neural process model (125) that are generated from the training outputs (155). In one embodiment, the training outputs (155) are compared to the training images (143). In one embodiment, the training outputs (155) (i.e., the mean and variance images) are used to generate sample images in which the pixels of a sample image are samples from the distributions defined by the pixels of the mean and variance images.

Continuing with FIG. 1, the user devices A (102) and B (107) through N (109) are computing systems (further described in FIG. 5.1). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view services and information hosted by the system (100), including the predicted data (187). In one embodiment, the user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109), respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112).

As an example, the user application A (105) may be used to select the sparse context inputs (117). The sparse context inputs (117) that are selected are then processed by the attentive neural process model (125) to generate the output that includes the predicted mean images (127) and the predicted variance images (129), which may be displayed on user application A (105).

As an example, the user application N (109) may be used to train the attentive neural process model (125). The training images (143) are selected, and the training application (141) is invoked to train the attentive neural process model (125) with the training images (143). The trained version of the attentive neural process model (125) may then by used by other client devices.

The repository (180) is a computing system that may include multiple computing devices in accordance with the computing system (500), and the nodes (522) and (524) described below in FIGS. 5.1 and 5.2. The repository (180) may be hosted by a cloud services provider that also hosts the server (112). The cloud services provider may provide hosting, virtualization, and data storage services as well as other cloud services to operate and control the data, programs, and applications that store and retrieve data from the repository (180). The data in the repository (180) includes the training data (181), the model data (183), the sparce data (185), and the predicted data (187).

The training data (181) is data used to train the machine learning models used by the system (100), including the attentive neural process model (125). In one embodiment, the training data (181) includes well data with measurements of geological properties and may include simulated well data of geological properties.

The model data (183) is data that defines the machine learning models used by the system (100), including the attentive neural process model (125). The model data (183) may include parameters, weights, hyperparameters, etc.

The sparce data (185) is data for the geological properties (121) of the sparse context inputs (117). The sparce data (185) may include well data from different well sites. The well data from the sparce data (185) may be processed to generate images (two-dimensional or three-dimensional) that include the geological properties (121) at the context locations (119) to form the sparse context inputs (117).

The predicted data (187) is data that includes the predicted mean images (127) and the predicted variance images (129). The predicted data (187) is the output from the attentive neural process model (125) stored in the repository (180) that may be retrieved, processed, and displayed by the user devices A (102) and B (107) through N (109) through the system (100).

Although shown using distributed computing architectures and systems, other architectures and systems may be used. In one embodiment, the server application (115) may be part of a monolithic application that implements the modeling and management of affinity networks. In one embodiment, the user applications A (105) and B (108) through N (110) may be part of monolithic applications that implement and use affinity networks without the server application (115).

FIG. 2.1 is a diagram of a computing system (200) in accordance with one or more embodiments of the disclosure. The computing system (200) may be a computing system such as described below with reference to FIGS. 5.1 and 5.2. In one embodiment, the computing system (200) includes a repository (not shown). The repository may be any type of storage unit and/or device (e.g., a file system, database, collection of tables, or any other storage mechanism) for storing data. Further, the repository may include multiple different storage units and/or devices. The multiple different storage units and/or devices may or may not be of the same type or located at the same physical site.

As shown in FIG. 2.1, the computing system (200) includes context input (202), an attentive neural process (ANP) model (204), target locations (206), predicted properties (208), and uncertainty estimates (210). The context input (202), target locations (206), predicted properties (208), and/or uncertainty estimates (210) may be stored in the repository.

The context input (202) includes property measurements (214) corresponding to context locations (212). That is, the property measurements (214) may be measurements of various properties at the context locations (212). The property measurements (214) may be sparse measurements of properties sampled at a small number of context locations (212). The context locations (212) may be spatial coordinates. Thus, the context locations may also be referred to as context points. For example, a context location may be two dimensional or three dimensional coordinates. A property may be a feature of the well, such as acoustic impedance, density, porosity, etc. The target locations (206) are locations for which predicted properties (208) are sought. FIG. 4.1 shows an example of sparse context input (i.e., the 30 context points) and target locations (e.g., including 30,000 target points).

The ANP model (204) includes functionality to generate, for the target locations (206) given the context input (202), predicted properties (208) and corresponding uncertainty estimates (210). The predicted properties (208) may be represented as a function with a distribution of values corresponding to the target locations (206). The uncertainty estimates (210) indicate confidence levels corresponding to the predicted properties (208).

Turning to FIG. 2.2, the ANP model (204) includes an encoder and a decoder. The context input ($x_c$, $y_c$) is the input to the encoder, where the $x_c$ values are locations, and the $y_c$ values are property values. The encoder includes a deterministic path and a latent path. In the deterministic path, the context input is passed through a deterministic attention layer of a neural network to generate a first set of values r1, r2, r3. The first set of values are aggregated with a cross attention layer to generate a first internal representation r*. In the latent path, the context input is passed through a latent attention layer of a neural network and averaged to obtain a second internal representation $s_c$. Then, internal representation $s_c$ is used to parametrize the distribution of a latent variable z, yielding a latent distribution q (z|$s_c$). The distribution chosen for q (z|$s_c$) may be a Gaussian, as mean and variance parameters suffice to define a Gaussian distribution.

In FIG. 2.2, the target locations are represented by x*, and the predicted properties at the target locations are represented by y*. The target locations x* may also be referred to as the target query. The two outputs generated by the encoder, r* and z, are concatenated alongside the target locations x* to obtain the input to the decoder. The decoder is an MLP that generates the parameters of a distribution p(y*|x*,$r_c$,z). The y* values are obtained by sampling from the distribution y*~p(y*|x*,$r_c$,z). The predicted distribution p(y*|x*,$r_c$,z) may be a Gaussian. Thus, the ANP may learn a distribution of predicted properties over functions (e.g., for a series of locations), rather than predicting a single property value for a single target location. When the predicted distribution is a Gaussian, the decoder predicts the mean and the variance of the Gaussian, where the variance represents the uncertainty in the predicted properties.

The ANP model (204) includes a cross-attention layer. The cross-attention layer includes functionality to focus the attention on the context locations that are deemed relevant for predicting property values at the target locations. For example, the cross-attention layer may assign weights $w_i$ to context input pairs ($x_i$, $y_i$) to form a target query-specific representation r=$\Sigma_i$ $w_i r_i$, where the weights may be used to focus attention on the relevant context input pairs. Thus, when the ANP model (204) predicts geological properties at target locations, the weights assigned by the ANP model (204) may focus attention on the context locations relevant to the target locations. Thus, the cross-attention layer addresses a limitation of conventional NP models where an aggregator in the encoder calculates a mean across context input, assigning the same weight (e.g., the same relevance) to the context locations. Assigning the same weight to the context locations limits the ability of the decoder to learn which context locations provide relevant information for predicting property values at target locations.

The weights may be learned by optimizing the evidence lower bound (ELBO) to the logarithm of the predicted distribution, as shown in FIG. 4.2, where C represents context locations and T represents target locations. The ELBO includes two terms: 1) the expected log-likelihood of the decoder predictions conditioned on the encoder representations, indicating the reconstruction loss from the decoder; and 2) the negative KL divergence between the latent variable distribution conditioned on target locations q(z|target) and the latent variable distribution conditioned on context locations q(z|context). The second term functions as a regularization factor, causing the encoding of the target locations to approximate the encoding of the context locations, which allows the NP to learn from the available context input.

While FIG. 2.1 and FIG. 2.2 show configurations of components, other configurations may be used without departing from the scope of the disclosure. For example, various components may be combined to create a single component. As another example, the functionality performed by a single component may be performed by two or more components.

Turning to FIG. 3.1, the process (300) implements property modeling using attentive neural processes. The process (300) may be performed by a computing device interacting with one or more additional computing devices. For example, the process (300) may execute on a server response to one or more user devices.

At Block 302, sparse context input is received that includes context locations. The context locations correspond to physical locations that include values for geological properties. The sparce context input may be identified by a client device and retrieved from a database. In one embodiment, retrieval of the sparce context input may include constructing the sparse context input as an image that includes sparse data of well measurement values of geological properties. The position of pixels of the images of the sparse context input may represent physical locations with the values of the pixels representing measurement values of the geological properties at the physical locations represented by the pixels. The sparse context input may be sparse in that a sparse threshold amount of pixels of the sparse context input include data of geological properties. For example, less than 1%, 10%, 30%, etc., of the pixels may include data of geological properties.

At Block 305, target locations in a space of the context locations are selected. In one embodiment, the context locations correspond to pixels of an image for the sparse context input, which corresponds to a physical space (e.g., longitude, latitude, depth). The target locations selected correspond to the same space as the sparse context input and corresponding image. For example, a sparse context input may include an image that is 150 by 200 pixels with each pixel corresponding to a location in a physical space having a latitude, longitude, and depth. The image may have 30 pixels that correspond to context locations. The target locations may correspond to the pixels of the image and overlap with the pixels the correspond to the context locations.

In one embodiment, the selected target locations may include a target location selected for each pixel of the image of the sparse context input. For example, a sparse context input image may include 150 by 200 pixels, 30 context locations, and 30,000 target locations (one for each pixel).

At Block 308, a predicted mean image for the geological property is generated by an attentive neural process model using the target locations and the sparse context input. In one embodiment, a predicted variance image may also be generated by the attentive neural process model using the target locations and the sparse context input. In one embodiment, the attentive neural process model processes the sparse context input with the target locations as described by the process of FIG. 3.2.

In one embodiment, the sparce context input and one target location are input to the attentive neural process model, which outputs a mean value and a variance value that corresponds to the target location. The mean value is written to a pixel of the predicted mean image and the variance value is written to a corresponding pixel of the predicted variance image. This process may be repeated for each of the target locations (i.e., each of the pixels of the predicted mean and variance images) to generate the predicted mean and variance images.

In one embodiment, the predicted mean image includes a pixel that corresponds to a target location and includes mean value for the geological property. In one embodiment, the predicted variance image includes a pixel corresponding to a target location and includes a variance value from a mean value for the geological property. In one embodiment, the target location corresponds to pixels at similar locations in each of the image of the sparse context input, the predicted mean image, and the predicted variance image.

In one embodiment, the attentive neural process model is trained by receiving an original image, selecting a plurality of training context locations from the original image, and processing the original image with the training context locations to generate a masked image. The original image may have values for geological properties for each pixel of the original image. The masked image may have values for geological properties at pixels the correspond to the training context locations.

In one embodiment, the attentive neural process model is further trained by processing the masked image to generate a training mean image and a training variance image, processing the training mean image and the training variance image to generate a training sample image, and updating the attentive neural process model based on the training sample image and an original image. A sample may be generated from a mean and variance by generating a normally distributed random number and multiplying the number by the square root of the variance (i.e., the standard deviation) and adding the mean. In one embodiment, backpropagation is used to update the weights of the attentive neural process model.

At Block 310, the predicted mean image is presented. In one embodiment, a presented variance image may be presented. In one embodiment, a sample image generated from the predicted mean image and the predicted variance image may be presented. In one embodiment, presentation may include sending an image (mean, variance, sample, etc.) to a downstream application the performs further processing of the image. In one embodiment, the image may be displayed by a client device.

In one embodiment, the sample image may be generated from the predicted mean and variance images. For example, a pixel for the sample image may be generated by generating a normally distributed random number that is multiplied by the mean and variance values from corresponding pixels of the predicted mean and variance images.

Turning to FIG. 3.2, a flowchart is depicted in accordance with one or more embodiments of the disclosure. The flowchart depicts a process for property modeling. One or more of the blocks in FIG. 3.2 may be performed by the components (e.g., the attentive neural process (ANP) model (204) of the computing system (200)) discussed above in reference to FIGS. 1, 2.1, and 2.2. In one embodiment, one or more of the blocks shown in FIG. 3.2 may be omitted, repeated, and/or performed in parallel, or in a different order than the order shown in FIG. 3.2. Accordingly, the scope of the disclosure should not be considered limited to the specific arrangement of blocks shown in FIG. 3.2.

In Block 352, context input is encoded by a deterministic attention layer of an encoder to obtain a first internal representation. The deterministic attention layer corresponds to the deterministic path of the encoder.

In Block 354, attention is focused on a subset of locations of the context input by a cross-attention layer of the encoder to create an updated first internal representation. The cross-attention layer may focus the attention by assigning (using target locations) weights to the context locations. For example, the cross-attention layer may assign weights $w_i$ to context input pairs $(x_i, y_i)$ to form a representation $r = \Sigma_i w_i r_i$ that is specific to the target locations, where the weights may be used to focus attention on the relevant context input pairs.

In Block 356, the context input is encoded by a latent attention layer of the encoder to obtain a second internal representation. The latent attention layer corresponds to the latent path of the encoder.

In Block 358, a distribution of a latent variable is parametrized, using the second internal representation. The distribution may be a Gaussian.

In Block 360, target locations, the updated first internal representation, and the distribution of the latent variable are concatenated to obtain a concatenated input.

In Block 362, the concatenated input is decoded, by a decoder MLP, to generate parameters of a distribution of property values and an uncertainty measure corresponding to the distribution of property values. The decoder may predict the mean and the variance of the distribution, where the variance represents the uncertainty in the predicted property values.

FIGS. 4.1, 4.2, 4.3, 4.4, 4.5, 4.6, 4.7, 4.8, 4.9, and 4.10 show examples according to embodiments of the disclosure. FIG. 4.1 shows a three dimensional image sliced into multiple two dimensional images with 30 random context locations (points) and 30,000 target context locations (points). As described above, FIG. 4.2 shows an equation used to learn weights by optimizing the evidence lower bound (ELBO) to the logarithm of the predicted distribution. As discussed further below, FIG. 4.3 shows a visualization of how a 2-D image completion problem may be framed as a 2-D regression task where f (pixel coordinates)=pixel brightness. As further discussed further below, FIG. 4.4 shows a table with coordinates ("i", "j", "k") for pixels and corresponding geological properties ("Rand", "AI", "Density", "Facies", and "Perm"). As discussed further below, FIG. 4.5 shows data that may be used to train an attentive neural processing model. As discussed further below, FIGS. 4.6, 4.7, 4.8, 4.9, and 4.10 show examples of images inputs to and outputs from an attentive neural processing model.

NP models have many desirable properties, including:

1) Scalability: NP models are computationally efficient, scaling linearly with the number of context and target locations at both training and prediction time. With ANPs, due to the cross-attention layer, the computational complexity is raised from O(n+m) to O(n(n+m)), where n and m are the number of context and target locations, respectively. However, a portion of the computation performed by the cross-attention layer may be calculated by matrix multiplication, and may be parallelized.

2) Flexibility: Since NP models define a wide variety of distributions, an arbitrary number of target locations may be predicted by conditioning on an arbitrary number of context locations. Thus, NP models may perform property modeling conditioned on any number of true well measurements.

3) Range of tasks: NP models have been shown to work effectively on a number of different tasks, ranging from 1-D function regression to more complex tasks such as image completion, as shown in FIG. 4.3. For example, FIG. 4.3 shows 1-D function regression (on the left) and image completion (on the right). The diagram in the middle of FIG. 4.3 visualizes how a 2-D image completion problem may be framed as a 2-D regression task where f (pixel coordinates) =pixel brightness.

The ANP model may be trained for property modeling using a training dataset that includes locations selected as the inputs $x_i$ and property values selected as the outputs $y_i$, so that the ANP model solves a regression problem of the type f (location)=property values. Predicting properties in a 2-D space is equivalent to modeling a 2-D regression problem. Similarly, predicting properties in a 3-D space is equivalent to modeling a 3-D regression problem. The context and target locations in the training dataset may be chosen randomly from available data, so that the ANP model may learn a wide variety of conditional distributions.

The open-source Stanford VI reservoir dataset was used to train the ANP model. The dataset is 3-D with dimensions of 150×200×200 (total of 6 million cells) and was generated for the general purpose of testing any proposed algorithm for reservoir modeling, reservoir characterization, and production forecasting. The dataset includes many geological and petrophysical properties like facies (channel bodies), porosity, permeability, P and S wave velocity, seismic attributes like acoustic impedance (AI) etc. The geological properties for the 3-D region are recorded in a tabular format as shown in FIG. 4.4. The tuple (i, j, k) indicates the grid location in the 3-D volume. The geological properties, such as acoustic impedance (AI) and density at location (i,j,k) are stored in a tabular format. The Stanford VI dataset includes 3 facies zones having different geometries as shown in FIG. 4.5. The 3 zones are sinuous channels, meandering channels, and deltaic deposits. Due to the different geometries, the zones use a separate variogram modeling if Kriging is used to model properties. Hence, the dataset is a good example to test whether an ANP model may actually learn a wide variety of distributions.

Implementation

The 3D dataset (with dimensions being 150×200×200) may be viewed as 200 2-D slices of dimension 150×200 along the depth dimension. The aim is to predict property values of AI and facies on these 2-D slices given sparse measurements. The training dataset includes twenty percent of the slices such that there is good representation from the 3 facies zones. The remaining eighty percent of slices are part of the validation dataset and are used to evaluate the performance of the ANP model.

Because most geological datasets are 3-D or 4-D and define many properties, future work may involve training the ANP model on 3-D volumes and modeling many different properties conditioned on true well measurements.

The number of context locations is limited to the range of 30-60 and the number of target locations is limited to the range of 300-600. In a training epoch, the context and target locations are chosen randomly from the slices so that the ANP model learns from a wide variety of conditional distributions. A 4-layer neural network was used for both the encoder and decoder, and a Gaussian distribution was used for the latent variable z and the output distribution $p(y^*|x^*, r_c, z)$. The dot-product between the target query and the context locations was used to determine the weights for the attention layer.

Results

The trained 2-D ANP model was qualitatively evaluated on the validation dataset. FIG. 4.6 shows that the ANP model generates realistic sinuous patterns of acoustic impedance (AI) conditioned on true measurements (indicated by circles). The predicted mean image accurately resembles the original image. The variance image represents the uncertainty in the predictions, and much of the uncertainty is concentrated around the edges of the sinuous patterns. FIG. 4.6 shows, on the left, the masked image (containing true measurements) and the original image of a sinuous pattern of AI. On the right, FIG. 4.6 shows a variance and sampled image predictions of AI from the ANP model.

FIG. 4.7 shows, on the left, the masked image (containing true measurements) and the original image of a meandering channel pattern of Facies. On the right, FIG. 4.7 shows mean, variance and sampled image predictions of Facies from the ANP model. The ANP model is also able to generate realistic meandering channel patterns of Facies, as shown in FIG. 4.7, where the sampled pattern closely resembles the original pattern. As NP models define a wide variety of distributions, different patterns and properties are captured and a measure of uncertainty for the predictions is also provided.

ANP models are flexible models that may perform property modeling conditioned on any number of true well measurements. FIGS. 4.8-4.10 show that the ANP model predictions of facies are accurate irrespective of the number and location of the true well measurements. FIGS. 4.8-4.10 show ANP model predictions of facies on three different geometries conditioned on 10 true well measurements (i.e., in FIG. 4.8), 30 true well measurements (i.e., in FIGS. 4.9), and 100 true well measurements (i.e., in FIG. 4.10). The ANP model is also able to capture the three facies geometries present in the Stanford VI dataset. As the ANP model outputs both the mean and the variance image, many completions are obtained by sampling from the Gaussian distribution. Thus, a distribution of patterns is captured, rather than a single pattern or image, while honoring the physical constraints.

Embodiments of the disclosure may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (500) in FIG. 5.1 may be connected to or be a part of a network. For example, as shown in FIG. 5.2, the network (520) may include multiple nodes (e.g., node X (522), node Y (524)). A node may correspond to a computing system, such as the computing system shown in FIG. 5.1, or a group of nodes combined may correspond to the computing system shown in FIG. 5.1. By way of an example, embodiments of the disclosure may be implemented on a node of a distributed system that is connected to other nodes. By way of another example, embodiments of the disclosure may be implemented on a distributed computing system having multiple nodes, where a portion of the disclosure may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform at least a portion of one or more embodiments of the disclosure.

The computing system or group of computing systems described in FIGS. 5.1 and 5.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one embodiment, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail-such as in nested packet headers or nested document sections). Then, the raw, unprocessed stream of data symbols is parsed, in the context of the organizing pattern, into a stream (or layered structure) of tokens (where a token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A–B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B involves comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present a few examples of functions performed by the computing system of FIG. 5.1 and the nodes and/or client device in FIG. 5.2. Other functions may be performed using one or more embodiments of the disclosure.

In the above detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited by the attached claims.

What is claimed is:

1. A method comprising:
  retrieving a plurality of sparse context inputs comprising a plurality of context locations corresponding to a plurality of geological property values for a geological property;
  generating, via an attentive neural process model, a predicted mean image for the geological property using a plurality of target locations in a space and the plurality of sparse context inputs, wherein generating the predicted mean image comprises:
    encoding, by a latent attention layer of an encoder, the plurality of sparse context inputs to obtain an internal representation, wherein the encoder comprises a deterministic attention layer and the latent attention layer;
    parameterizing a distribution of a latent variable using the internal representation;
    concatenating the plurality of target locations, an additional internal representation, and the distribution to obtain a concatenated input; and
    decoding the concatenated input to generate one or more predicted mean pixels of the predicted mean image and one or more predicted variance pixels of a predicted variance image, wherein each pixel of the predicted mean image comprises a respective target location of the plurality of target locations; and
  presenting the predicted mean image.

2. The method of claim 1, further comprising:
generating the predicted variance image for the geological property by the attentive neural process model using the plurality of target locations and the plurality of sparse context inputs.

3. The method of claim 1, further comprising:
encoding, by the deterministic attention layer of the encoder, the plurality of sparse context inputs to obtain the additional internal representation, the plurality of sparse context inputs comprising the plurality of context locations; and
obtaining weights, by a cross-attention layer, for the plurality of context locations, wherein the weights focus a subset of the plurality of context locations to the plurality of target locations.

4. The method of claim 1, further comprising:
processing the predicted mean image and the predicted variance image to generate a predicted sample image.

5. The method of claim 1, further comprising:
presenting one or more of the predicted mean image, the predicted variance image, and a predicted sample image generated from the predicted mean image and the predicted variance image.

6. The method of claim 1, further comprising:
training the attentive neural process model, wherein training the attentive neural process model comprises:
  receiving an original image, wherein the original image comprises a plurality of pixels corresponding to a plurality of geological properties the original image;
  generating a plurality of training context locations from the original image, wherein the plurality of training context locations corresponds to a subset of the plurality of pixels of the original image;
  processing the original image with the plurality of training context locations;
  generating a masked image, wherein the masked image comprises respective geological properties at pixels corresponding to the plurality of training context locations; and
  outputting a trained attentive neural process model.

7. The method of claim 6, further comprising:
processing the masked image to generate a training mean image and a training variance image;
processing the training mean image and the training variance image to generate a training sample image; and
updating the attentive neural process model based on the training sample image and an original image.

8. The method of claim 1, wherein the geological property values are indicative of one or more features of a well comprising an acoustic impedance, a density, a porosity, one or more additional features, or a combination thereof.

9. The method of claim 1, further comprising:
generating the predicted variance image, wherein each pixel of the predicted variance image corresponds to a respective target location of the plurality of target locations and a variance value from a mean value for the geological property.

10. A system comprising:

one or more processors;

memory, accessible by the one or more processors, the memory storing instructions that, when executed by the one or more processors, cause the one or more processors to perform operations comprising:

retrieving a plurality of sparse context inputs comprising a plurality of context locations comprising a plurality of geological property values for a geological property;

using an attentive neural process model to process the plurality of sparse context inputs using a plurality of target locations; and generating, via the attentive neural process model, a predicted mean image for the geological property by the attentive neural process model using the plurality of target locations in a space and the plurality of sparse context inputs, wherein generating the predicted mean image comprises:

encoding, by a latent attention layer of an encoder, the plurality of sparse context inputs to obtain an internal representation, wherein the encoder comprises a deterministic attention layer and the latent attention layer;

parameterizing a distribution of a latent variable using the internal representation;

concatenating the plurality of target locations, an additional internal representation, and the distribution to obtain a concatenated input; and decoding the concatenated input to generate one or more predicted mean pixels of the predicted mean image and one or more predicted variance pixels of a predicted variance image, and wherein each pixel of the predicted mean image comprises a respective target location of the plurality of target locations.

11. The system of claim 10, wherein operations further comprise:

generating the predicted variance image for the geological property by the attentive neural process model using the plurality of target locations and the plurality of sparse context inputs.

12. The system of claim 10, wherein operations further comprise:

encoding, by the deterministic attention layer of the encoder, the plurality of sparse context inputs to obtain the additional internal representation, the plurality of sparse context inputs comprising the plurality of context locations; and obtaining weights, by a cross-attention layer, for the plurality of context locations, wherein the weights focus a subset of the plurality of context locations to the plurality of target locations.

13. The system of claim 10, wherein operations further comprise:

processing the predicted mean image and the predicted variance image to generate a predicted sample image.

14. The system of claim 10, wherein operations further comprise:

presenting one or more of the predicted mean image, the predicted variance image and a predicted sample image generated from the predicted mean image and the predicted variance image.

15. The system of claim 10, wherein operations further comprise:

processing with the attentive neural process model, wherein the attentive neural process model is trained by:

receiving an original image;

selecting a plurality of training context locations from the original image; and processing the original image with the training context locations to generate a masked image.

16. A non-transitory computer readable medium comprising instructions that, when executed by one or more processors, are configured for:

retrieving a plurality of sparse context inputs comprising a plurality of context locations corresponding to a plurality of geological property values for a geological property;

generating, via an attentive neural process model, a predicted mean image for the geological property using a plurality of target locations and the plurality of sparse context inputs, wherein generating the predicted mean image comprises:

encoding, by a latent attention layer of an encoder, the plurality of sparse context inputs to obtain an internal representation, wherein the encoder comprises a deterministic attention layer and the latent attention layer;

parameterizing a distribution of a latent variable using the internal representation;

concatenating the plurality of target locations, an additional internal representation, and the distribution to obtain a concatenated input; and decoding the concatenated input to generate one or more predicted mean pixels of the predicted mean image and one or more predicted variance pixels of a predicted variance image, wherein each pixel of the predicted mean image comprises a respective target location of the plurality of target locations; and presenting the predicted mean image.

* * * * *